United States Patent
Liu

(10) Patent No.: US 10,148,713 B2
(45) Date of Patent: Dec. 4, 2018

(54) LIVE MANIFEST UPDATE

(71) Applicant: Adobe Systems Incorporated, San Jose, CA (US)

(72) Inventor: Fang Liu, Redmond, WA (US)

(73) Assignee: Adobe Systems Incorporated, San Jose, CA (US)

( * ) Notice: Subject to any disclaimer, the term of this patent is extended or adjusted under 35 U.S.C. 154(b) by 277 days.

(21) Appl. No.: 14/520,074

(22) Filed: Oct. 21, 2014

(65) Prior Publication Data

US 2016/0112484 A1 Apr. 21, 2016

(51) Int. Cl.
*H04L 29/06* (2006.01)

(52) U.S. Cl.
CPC ...... *H04L 65/4084* (2013.01); *H04L 65/4092* (2013.01); *H04L 65/80* (2013.01)

(58) Field of Classification Search
CPC ...... H04L 65/80; H04N 19/00; H04N 21/234; H04N 5/76; H04N 21/2387; H04N 21/47217
See application file for complete search history.

(56) References Cited

U.S. PATENT DOCUMENTS

| | | | |
|---|---|---|---|
| 8,341,255 B2 * | 12/2012 | Gopalakrishnan | H04L 65/4084 709/200 |
| 8,677,428 B2 * | 3/2014 | Lewis | H04N 21/44016 725/36 |
| 8,929,441 B2 * | 1/2015 | Ma | H04N 21/44209 375/240.1 |
| 9,197,559 B1 * | 11/2015 | Cloonan | H04L 41/12 |
| 2011/0252118 A1 * | 10/2011 | Pantos | G06F 17/30053 709/219 |
| 2013/0091249 A1 * | 4/2013 | McHugh | H04N 21/23439 709/219 |
| 2013/0191508 A1 * | 7/2013 | Strasman | H04N 21/2385 709/219 |
| 2014/0173025 A1 * | 6/2014 | Killick | H04N 21/266 709/217 |
| 2015/0052236 A1 * | 2/2015 | Friedrich | H04L 43/08 709/224 |

(Continued)

OTHER PUBLICATIONS

StackOverflow.com, "Will browsers cache pages with a different ETag?", Feb. 2012.*

*Primary Examiner* — Shirley X Zhang
(74) *Attorney, Agent, or Firm* — Wolfe-SBMC

(57) ABSTRACT

Live manifest update techniques are described. In one or more implementations, data streams of media content are provided to computing devices by a service provider. During playback of the data streams, a manifest associated with the data streams is updated by the service provider effective to cause the computing devices to transition to playing back the data streams using the updated manifest without restarting playback of the data streams. In one or more implementations, a data stream of media content is played back at a computing device. During playback of the data steam, a manifest monitoring module at the computing device monitors for updates to a manifest associated with the data stream. Responsive to detecting an update to the manifest, the computing device seamlessly transitions to playing back the data stream using the updated manifest without restarting playback of the data stream.

20 Claims, 8 Drawing Sheets

(56) References Cited

U.S. PATENT DOCUMENTS

| | | | |
|---|---|---|---|
| 2015/0201042 A1* | 7/2015 | Shah | H04L 65/60 709/219 |
| 2015/0271234 A1* | 9/2015 | O'Malley | H04L 65/602 709/219 |
| 2015/0334153 A1* | 11/2015 | Koster | H04L 65/4069 709/219 |
| 2016/0073106 A1* | 3/2016 | Su | H04N 21/234363 375/240.02 |

\* cited by examiner

LIVE MANIFEST UPDATE

BACKGROUND

Users have access to an ever increasing variety of streaming data. For example, users may view video clips, television programming, movies, and so forth via a network. Live media streaming may be accomplished with a variety of solutions, such as HTTP Dynamic Streaming (HDS) by Adobe®, HTTP Live Streaming (HLS) by Apple®, and others. These solutions leverage existing Internet infrastructure and strengths to deliver live or on-demand data streams in small, cache-friendly segments or chunks.

Some HTTP-based media streaming communication protocols, such as HLS and HDS, have defined bitrate profiles which enable bitrate adaptivity and stream failover. Each bitrate profile breaks the overall data stream into a sequence of small HTTP bused file downloads, each download loading one short chunk or segment of the overall data stream. As the data stream is played at a client device, the client device may select from a number of different alternate streams containing the same material encoded at a variety of different data rates, allowing the streaming session to adapt to the available data rate or bandwidth.

At the start of the streaming session, the client device receives a master manifest file, referred to as "manifest" herein. For example, HLS uses a manifest in the form of an .m3u8 file extension, while HDS uses a manifest in the form of an .f4m extension. The manifest provides the client with the location of the data streams for available bitrate profiles which enables the client to stream media content.

Conventionally, the manifest is defined as a static layout of bitrate profiles and renditions and server URLs. The manifest is static at the beginning of video playback and throughout the video playback, and is not expected to change. Similarly, server locations for variant data streams are also static. Consequently, if the manifest is changed during playback to reflect changes to server locations and bitrate availability, applications running on client devices will need to restart their playback session to conform to the new manifest, which causes a disruption in the user's viewing experience.

SUMMARY

Live manifest update techniques are described. In one or more implementations, data streams of media content are provided to computing devices by a service provider. During playback of the data streams, a manifest associated with the data streams is updated by the service provider effective to cause the computing devices to transition to playing back the data streams using the updated manifest without restarting playback of the data streams.

In one or more implementations, a data stream of media content is played back at a computing device. During playback of the data steam, a manifest monitoring module at the computing device monitors for updates to a manifest associated with the data stream. Responsive to detecting an update to the manifest, the computing device seamlessly transitions to playing back the data stream using the updated manifest without restarting playback of the data stream.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional HTTP-based media stream communication protocols, such as HLS or HDS, use a static master manifest ("manifest"), or playlist, which specifies locations of chunks or segments of the data stream. The static manifest may also specify locations of various different bitrate profiles of the data stream. Each bitrate profile includes the same media content encoded with varying bitrates, such as a low bitrate, a medium bitrate, and a high bitrate. Thus, the static manifest enables computing devices to switch between different bitrate profiles based on the available bandwidth. These conventional solutions, however, will not adapt, during playback of the data stream, to an updated manifest. Instead, data streams of the old manifest will continue to play at each computing device even if these data streams are offline or retired by the service provider. Eventually, this may cause playback to stop and users will perceive a disruption in the viewing experience, such as by a playback application triggering an automatic restart to accept the updated manifest.

Live manifest update techniques, described herein, enable service providers to dynamically update or change the manifest while the data stream is being played back at client devices, such as by changing servers, removing bitrate profiles, or adding bitrate profiles.

A manifest monitoring module, implemented at a client device, is configured to monitor the data stream, during playback of the data stream, for updates to the manifest by the service provider. When an update is detected, various different approaches may be selected by each client device which enable a seamless transition to playing back the data stream using the updated manifest without a disruptive restart. The approaches described to enable the seamless transition are selected based on both the bitrate profile that is currently being played back at each respective client device, as well as the updates to the manifest. Thus, the live manifest techniques are configured to handle a variety of different playback scenarios across multiple different client devices.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
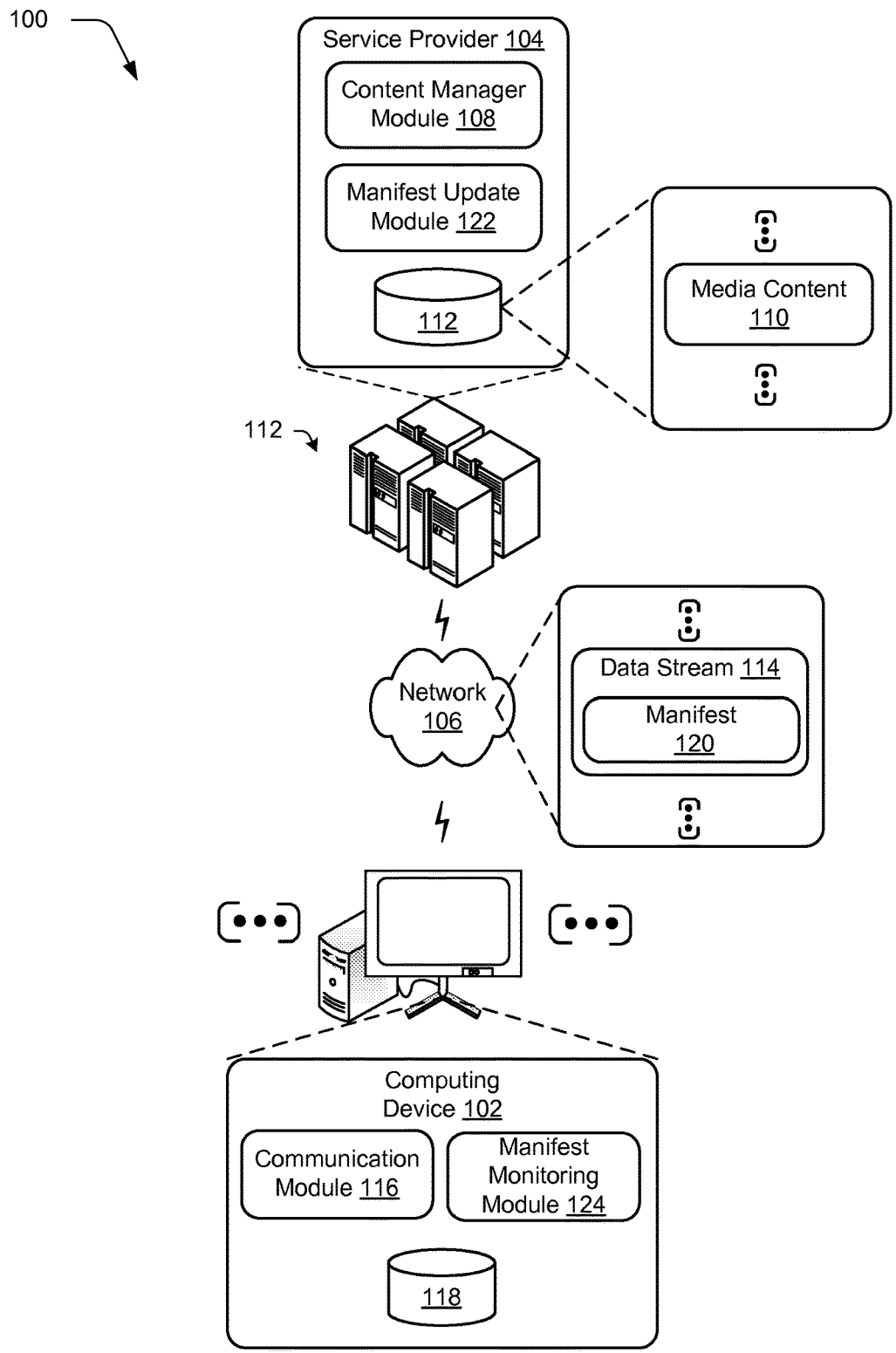
FIG. 1 is an illustration of an environment 100 in an example implementation that is operable to employ the live manifest update techniques described herein.

FIG. 1 is an illustration of an environment 100 in an example implementation that is operable to employ the live manifest update techniques described herein. The illustrated environment 100 includes a computing device 102 and a service provider 104 that are communicatively coupled, one to another, via a network 106. The computing device 102 is illustrated as one of a plurality of different examples of devices that may receive content from service provider 104, i.e., client devices. Computing devices that implement computing device 102 as well as service provider 104 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some instances, (e.g., computing device 102), the computing device may be representative of a plurality of different devices, such as multiple servers utilized by a business to perform operations "over the cloud" as illustrated for service provider 104, further discussion of which may be found in relation to FIG. 8.

Service provider 104 is illustrated as including a content manager module 108 along with media content 110 that is available via a storage 112. Content manager module 108 is representative of functionality to communicate media content 110 via a data stream 114 to computing device 102 via network 106. Media content 110 may be configured in a variety of ways, such as a video, audio, television program, or other type of media or data that is configured for streaming via network 106, e.g., as one or more packets of data stream 114. Data stream 114, for instance, may be configured as a sequence of digital encoded data packets that are utilized to communicate media content 110 from storage 112 via the network 106. The data packets may then be decoded and consumed in sequence to recreate the source data, such as a television program, movie, music, sporting event, and so forth.

Media content 110 may be received by a communication module 116 via network 106 using data stream 114. Media content 110 may then be output for rendering, cached in a storage 118 (e.g., using buffering techniques), stored in storage 118 for later output, and so on. Communication module 116 is representative of a variety of different functionality, such as a media player, operating system, network-enabled application, plug-in module, and so forth.

Data stream 114 may be implemented as any type of media streaming communication protocol, such as HTTP Dynamic Streaming (HDS) by Adobe®, HTTP Live Streaming (HLS) by Apple®, and others. These solutions leverage existing Internet infrastructure and strengths to deliver live or on-demand data streams in small, cache-friendly segments or chunks.

Each data stream 114 includes a master manifest ("manifest") 120 which is transmitted from service provider 104 to computing device 102 before the streaming session begins. Manifest 120 specifies locations, such as server URLs, of the segments of media content of data stream 114. Manifest 120 may be configured in a variety of ways. For example, manifest 120 may be configured as an HTTP streaming manifest. Other manifest configurations are also contemplated, such as in accordance with HLS from Apple® (e.g., using an .m3u8 file extension), HDS from Adobe® (e.g., using an .f4m extension), and so forth.

Manifest 120 may also specify locations of various different bitrate profiles of data stream 114. Each bitrate profile includes the same media content encoded with varying bitrates, such as a low bitrate, a medium bitrate, and a high bitrate. Thus, manifest 120 enables computing device 102 to switch between different bitrate profiles based on the available bandwidth. For example, when there is a high available bandwidth, computing device 102 may request and receive a high bitrate version of data stream 114, and then may adaptively switch to a lower bitrate version of data stream 114 when the available bandwidth decreases.

In accordance with various implementations, the techniques describe ways to dynamically update the master manifest during live playback of the data stream, and to seamlessly transition to playback of the data stream using the updated manifest without a disruptive restart.

Functionality involving dynamically updating manifest 120 is represented by a manifest update module 122. Such updates to manifest 120 may include updating server locations, removing bitrate profiles, adding bitrate profiles, and so forth. Updating manifest 120 causes computing devices 102 that are currently streaming data stream 114 to detect the update, and to seamlessly transition to playing data stream 114 using the updated manifest.

Functionality involving detection of updates to manifest 120, during playback of data stream 114, are represented by a manifest monitoring module 124. Manifest monitoring module 124 is configured to detect updates to manifest 120 during playback of media content 110, and facilitate a seamless transition to streaming data stream 114 using the updated manifest.

Figure 2:
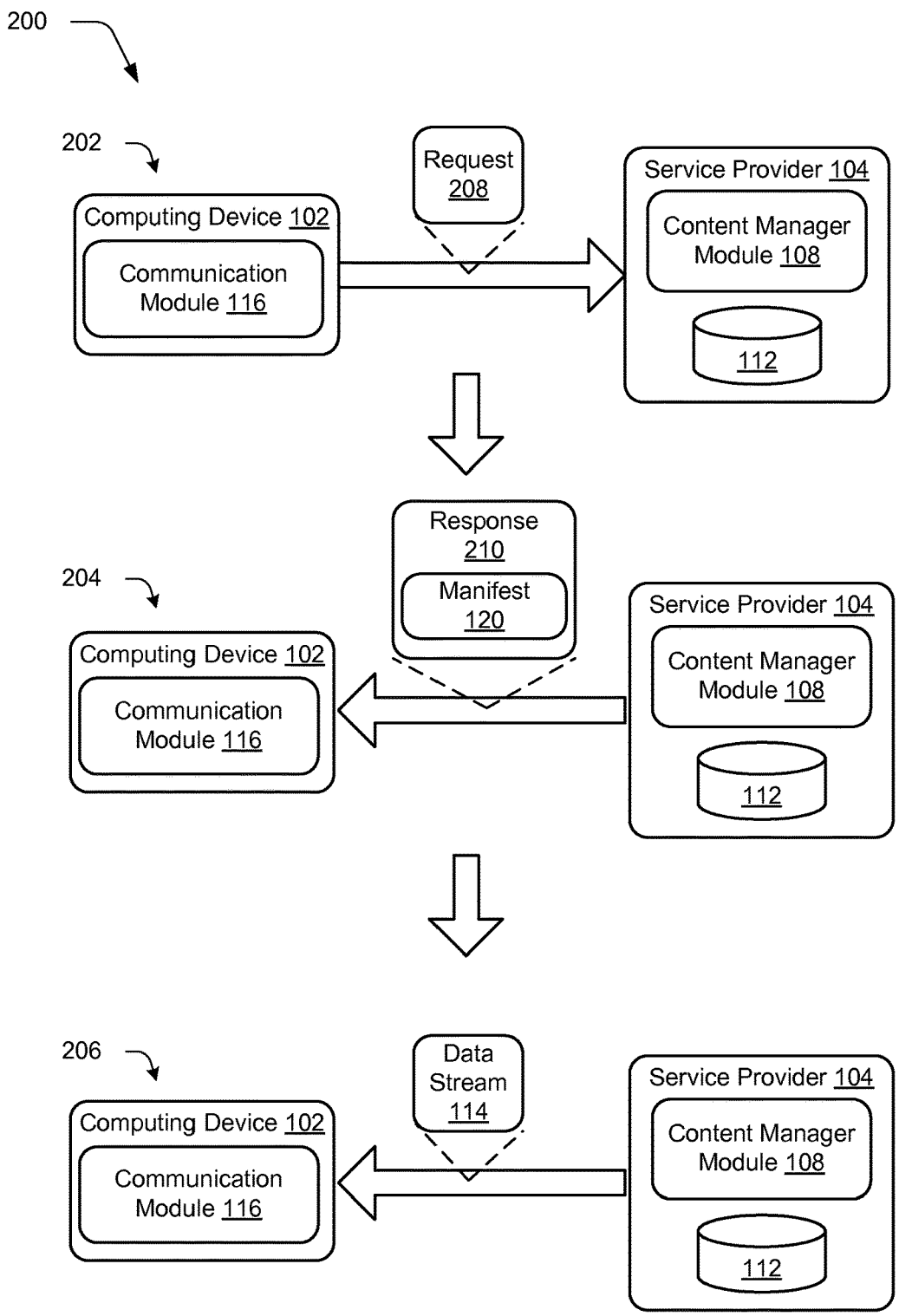
FIG. 2 illustrates a system in an example implementation in which a computing device requests and receives a data stream from a service provider.

FIG. 2 illustrates a system 200 in an example implementation in which a computing device requests and receives a data stream from a service provider. The system 200 is illustrated through the use of first, second, and third stages 202, 204, and 206.

At first stage 202, a request 208 to receive a data stream is transmitted from communication module 116 of computing device 102 over a network, such as network 106, and received by service provider 104. Request 208, for instance, may be sent by a web browser, web-based application, or other configuration of communication module 116 to obtain the data stream. As previously described, the streaming data may take a variety of different forms, such as configured in accordance with a Hypertext Transfer Protocol (HTTP).

At second stage 204, service provider 104 sends a response 210 that is received by communication module 116 of computing device 102. Response 210 indicates how computing device 102 is to access the data stream from service provider 104. Response 210 include manifest 120 that specifies locations (e.g., server URLs) at which computing device 102 can access the data stream. In addition, manifest 120 may specify multiple different bitrate profiles, which each include multiple versions of the requested data stream that are encoded at varying bitrates.

Figure 3:
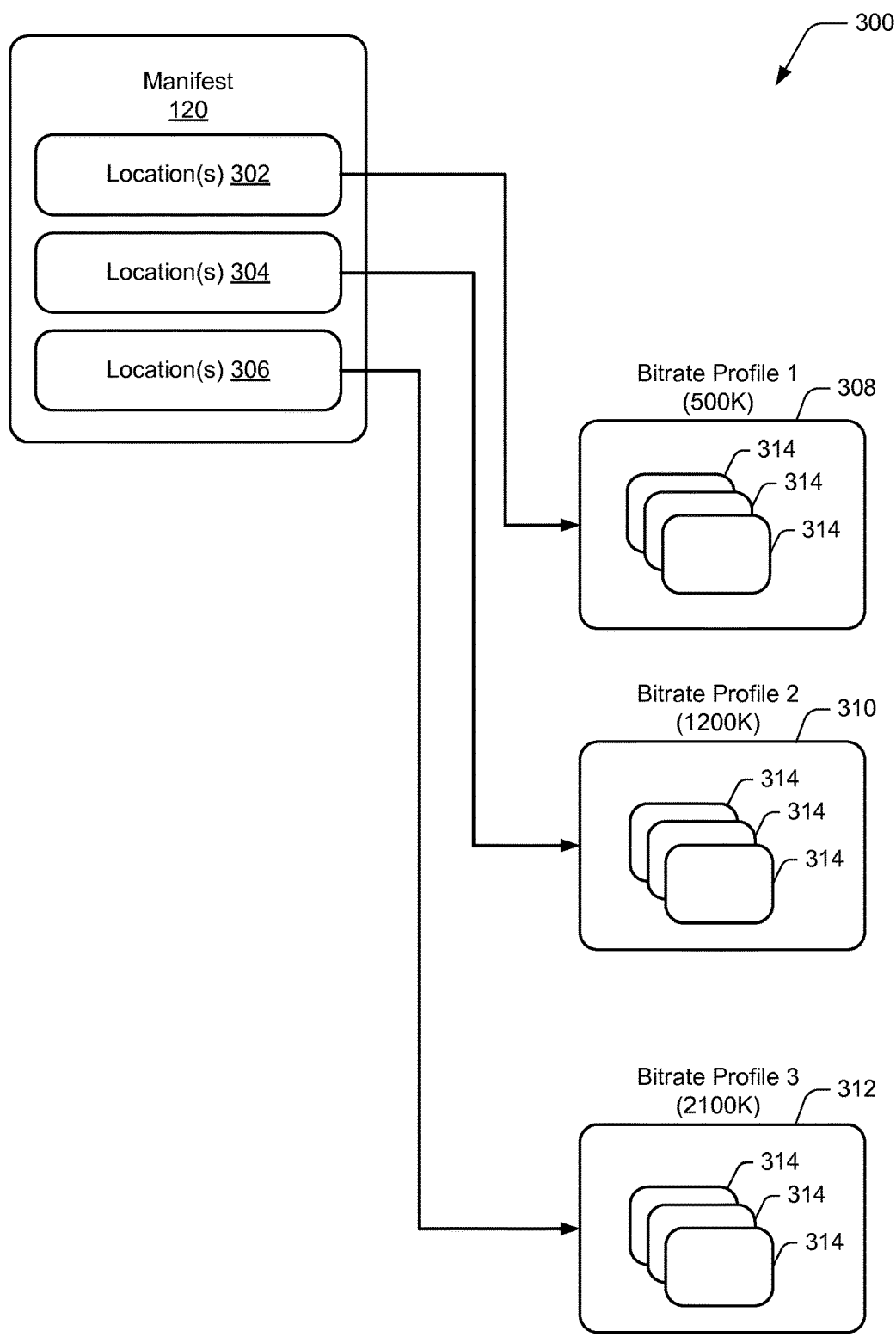
FIG. 3 illustrates an example of a manifest associated with a data stream

Consider, for example, FIG. 3 which illustrates an example 300 of a manifest associated with a data stream. In this example, manifest 120 includes locations 302, 304, and 306 which specify the location, e.g., server URL, of bitrate profiles 308, 310, and 312, respectively. Bitrate profiles 308, 310, and 312 may be located at a single server, or multiple different servers. Each bitrate profile includes segments 314 of the same media content 110, but is encoded with varying bitrates.

In this example, bitrate profile 308 corresponds to a "low" bitrate of 500 k, and thus segments 314 of bitrate profile 308 are encoded with a bitrate of 500 k. Similarly, bitrate profile 310 corresponds to a "medium" bitrate of 900 k and bitrate profile 312 corresponds to a "high" bitrate of 2100 k, and thus segments 314 of bitrate profile 310 and 312 are encoded with bitrates of 900 k and 2100 k, respectively. The variance of different bitrate profiles 308, 310, and 312 enable computing device 102 to dynamically failover, such as when the available bandwidth at computing device 102 increases or decreases Returning to FIG. 2, at third stage 206, communication module 116 requests the data stream from service provider 104 using manifest 120 received with response 210 at second stage 204. For example, communications module 116 requests the data stream from a location specified in manifest 120. In some cases, communication module 116 is further configured to determine which bitrate profile to select. For example, communication module 116 can request a bitrate profile based on the available bandwidth at computing device 102. Responsively, content manager module 108 communicates the requested data stream 114 to computing device. The media content of data stream 114 may then be played back at computing device 102.

Conventional data streaming applications cache the manifest and do not expect the manifest to be updated during playback. However, as described throughout, in some cases, service providers may want to dynamically update the manifest, and have this effect felt by devices currently playing the data steam.

Figure 4:
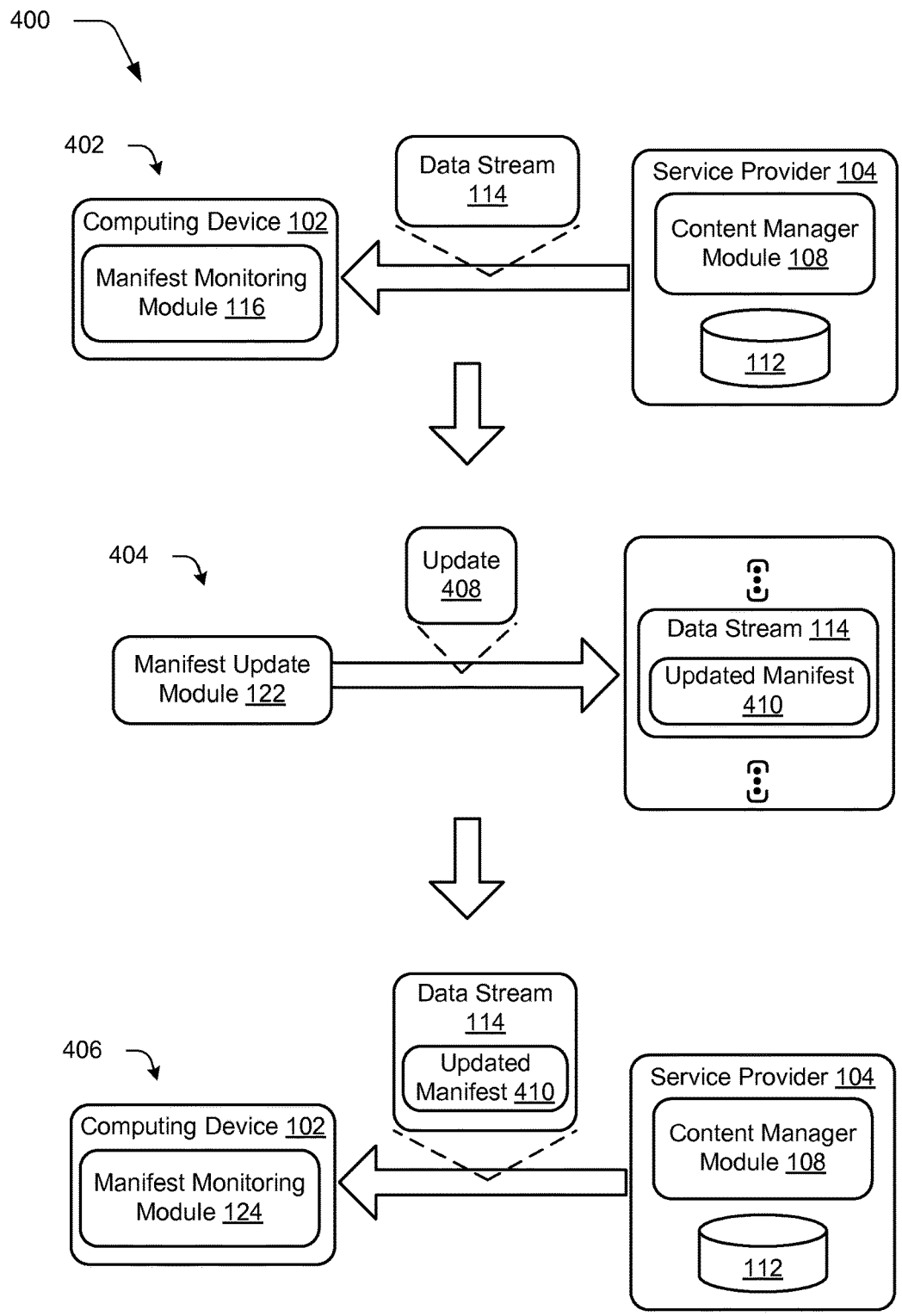
FIG. 4 illustrates a system in an example implementation in which a manifest update module updates a manifest associated with a data stream, and a manifest monitoring module monitors for and detects the updated manifest during playback of the data stream.

FIG. 4 illustrates a system 400 in an example implementation in which a manifest update module updates a manifest associated with a data stream, and a manifest monitoring module monitors for and detects the updated manifest during playback of the data stream. The system 400 is illustrated through the use of first, second, and third stages 402, 404, and 406.

At first stage 402, manifest monitoring module 124 monitors data stream 114 for updates to manifest 120. In some cases, manifest monitoring module 124 may be configured to monitor data stream 114 in a predetermined interval. For example, a parameter may be set to cause manifest monitoring module 124 to periodically check for updates to manifest 120, such as every minute, every five minutes, and so forth. In other cases, manifest update module 122 may provide a notification to manifest monitoring module 124 which causes manifest monitoring module 124 to check for updates to manifest 120. For example, the notification may be transmitted to manifest monitoring module 124 shortly before updates to data stream 114 are deployed.

To monitor for updates to manifest 120, manifest monitoring module 124 can monitor data stream 114 to detect a modified time and Etag from a HTTP request response which indicates that manifest update module 122 has updated manifest 120.

At 404, manifest update module 122 provides an update 408 to manifest 120 to generate an updated manifest 410 associated with data stream 114. There are various reasons for, and ways in which, manifest update module 122 may update manifest.

In some cases, update 408 may correspond to a server replacement. For example, a server streaming a certain bitrate profile of a data stream may go down, or issues with playback by multiple client devices may indicate a problem with a particular server. In these instances, the server used to stream data stream 114 may be replaced with a new server. Thus, to update manifest 120 when a server is replaced, manifest update module 122 may update the server location, e.g., locations 302, 304, or 306, of manifest 120 to point to the location or address of the new server.

Alternately or additionally, update 408 may correspond to the addition or removal of a bitrate profile of data stream 114. For example, manifest update module 122 may detect that many client devices are experiencing issues playing a particular bitrate profile of data stream 114, such as 2100 k bitrate profile 312 of FIG. 3. In this case, manifest update module 122 may remove the bitrate profile from manifest 120. Similarly, manifest update module 122 may determine that a new bitrate profile should be added to data stream 114, such as a higher or lower bitrate profile. Thus, manifest update module 122 may add a bitrate profile to manifest 120.

At 406, manifest monitoring module 124 detects updated manifest 410. For example, manifest monitoring module 124 may detect a modified time and Etag from a HTTP request response of data stream 114 which indicates that manifest update module 122 has updated manifest 120.

Upon detecting updated manifest 410, manifest monitoring module 124 compares updated manifest 410 to manifest 120, and initiates a transition to playing data stream 114 using updated manifest 410 based on the comparison.

Figure 5:
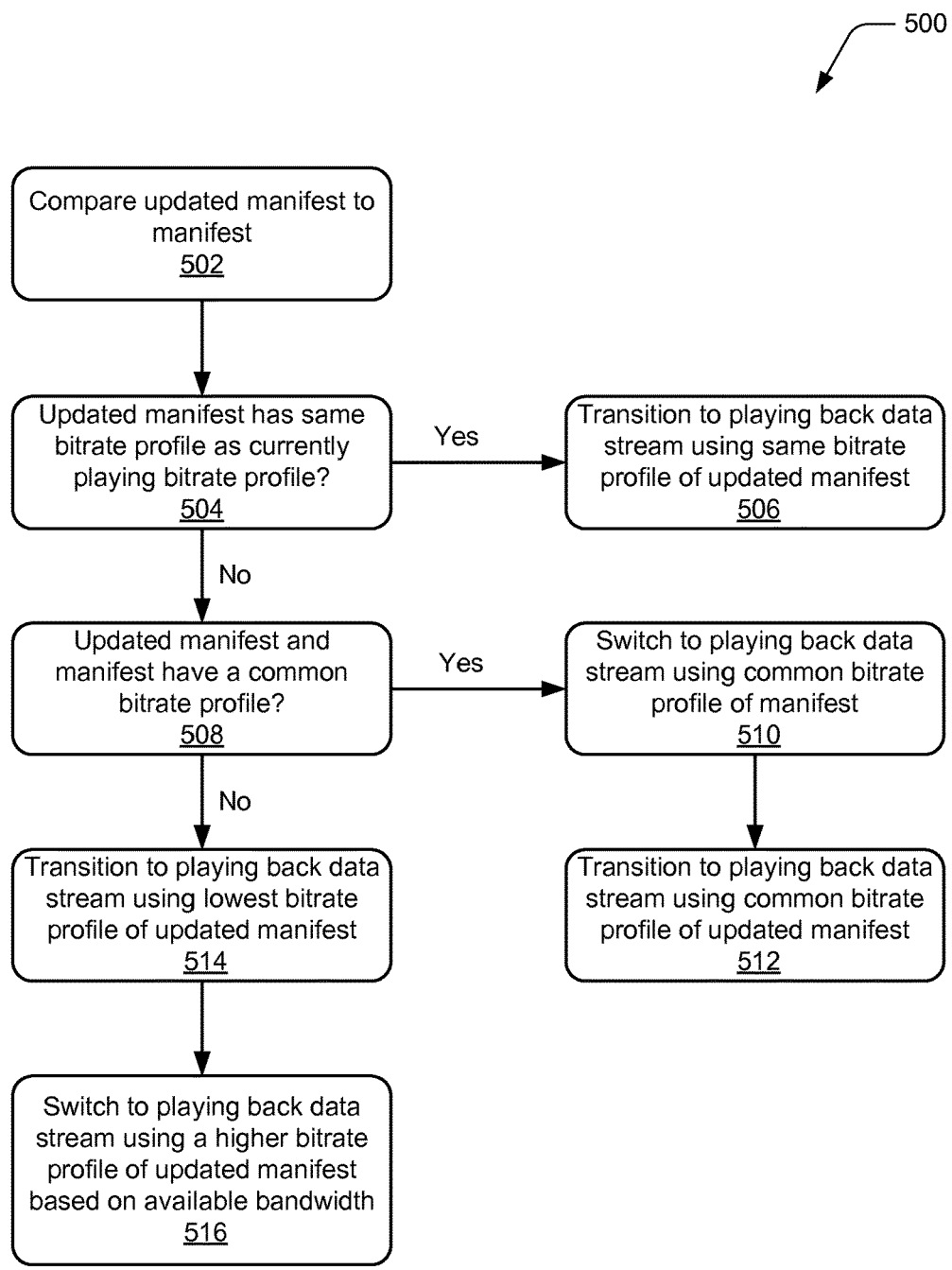
FIG. 5 illustrates a flow chart of various approaches taken by a manifest monitoring module of a computing device to transition to playback of a data stream using an updated manifest.

FIG. 5 illustrates a flow chart 500 of various approaches taken by a manifest monitoring module of a computing device to transition to playback of a data stream using an updated manifest.

Communication module 116 is configured to select various different approaches to enable a seamless transition to playing back the data stream using updated manifest 410. These approaches may be selected based on what has changed in the updated manifest (e.g., server locations, different bitrate profiles, and so forth) to ensure maximum smoothness in the transition to updated manifest 410. These approaches may also be selected based on the particular media content and bitrate profile that each computing device 102 is currently playing. Thus, each user will experience the transition in a way that is best configured to ensure that the user's watching transition is smooth.

After detecting an update to manifest at stage 406 of FIG. 4, manifest monitoring module 124 compares updated manifest 410 to manifest 120 (block 502). To do so, the content of updated manifest 410 is parsed and analyzed and compared to the content of the original manifest 120.

Based on the comparison, manifest monitoring module 124 determines whether updated manifest 410 has a same bitrate profile as a currently playing bitrate profile of data stream 114 at computing device 102 (block 504). If updated manifest 410 has a same bitrate profile as the currently playing bitrate profile, then manifest monitoring module 124 causes communication module 116 to transition to playing back the same bitrate profile of updated manifest 410 (block 506).

As an example, consider that computing device 102 is currently playing a 2100 k bitrate profile of data stream 114, and that manifest update module 122 updates manifest 116 by making a server change for the currently playing 2100 k bitrate profile. In this case, both manifest 120 and updated manifest 410 include the same 2100 k bitrate profile. Thus, manifest monitoring module 124 can seamlessly cause a transition from the currently playing 2100 k bitrate profile of manifest 120 to the same 2100 k bitrate profile of updated manifest 410. As the transition is between the same bitrates, there will be no interruption to playback and the user will not perceive the transition.

Alternately, if updated manifest 410 does not have the same bitrate profile as the currently playing bitrate profile, then manifest monitoring module 124 determines whether updated manifest 410 and manifest 120 have a common bitrate profile (block 508). If updated manifest 410 and manifest 120 have a common bitrate profile, then manifest monitoring module 124 causes communication module 116 to switch to playing back the common bitrate profile of manifest 120 (block 510). Then, after switching to the common bitrate profile of manifest 120, manifest monitoring module 124 causes a communication module 116 to transition to play the common bitrate profile of updated manifest 410 (block 512).

As an example, consider that computing device 102 is currently playing the 2100 k bitrate profile of data stream 114, and that manifest update module 122 updates manifest 120 by removing the 2100 k bitrate profile from updated manifest 410. In this example, both manifest 120 and updated manifest 410 each include a 1200 k bitrate profile. Thus, manifest monitoring module first causes computing device 102 to switch from playing back the 2100 k bitrate profile to playing back the 1200 k bitrate profile of manifest 120. This bitrate switch involves key frame stitching of two different bitrates, and thus the transition will be smooth with no video artifacts.

Then, after switching to the common bitrate profile, manifest monitoring module 124 can seamlessly cause a transition from the currently playing 1200 k bitrate profile of manifest 120 to the same 1200 k bitrate profile of updated manifest 410. This transition will be just like the transition at step 506 because the transition is between the same bitrates. Thus, in this two-step transition, the user will not perceive any disruption to playback of the data stream.

Alternately, if updated manifest 410 does not have either the same bitrate profile as the currently playing bitrate profile or a common bitrate profile, then manifest monitoring module 124 causes communication module 116 to transition to playing back the lowest bitrate profile of updated manifest 410 (block 514). After making the transition to the lowest bitrate profile of updated manifest 410, manifest monitoring module 124 may cause communication module 116 to switch to a higher bitrate profile of updated manifest 410 based on the available bandwidth of computing device 102 (block 516).

As an example, consider that computing device 102 is currently playing the 2100 k bitrate profile of data stream 114, and that manifest update module 122 updates manifest 120 by removing the 2100 k, 1200 k, and 500 k bitrate profiles, and adding a 400 k bitrate profile and a 1500 k bitrate profile. In this case, manifest 120 and updated manifest 410 do not have any bitrate profiles in common.

Thus, manifest monitoring module 124 transitions to playing back the lowest bitrate profile of updated manifest 410, which in this case is 400 k. By transitioning to the lowest bitrate profile of updated manifest 410, manifest monitoring module 124 ensures that computing device 102 will be able to stream the low bitrate profile. This transition may cause a slight glitch in playback, but may not even be noticed by the user and is much less disruptive than the hard restart required by conventional solutions.

Shortly after the transition, manifest monitoring module 124 may switch to a higher bitrate profile based on the available bandwidth. For example, manifest monitoring module 124 may switch to the 1500 k bitrate profile of updated manifest 410 if computing device 410 has sufficient bandwidth to stream the 1500 k bitrate profile.

If the transition to updated manifest 410 is not successful in any of the steps above, the playback of data stream 114 may continue at computing device 102 using the original manifest 120.

Consider now various implementation examples of the live manifest update techniques described herein.

Implementation Examples

In a first implementation example, consider that there are three bitrate profiles broadcasting live: 500 k, 900 k, and 2100 k. The 2100 k data stream has some issues that need to be restarted. Thus, manifest update module 122 updates manifest 120 by removing the 2100 k bitrate profile, such that the manifest now only contains the 500 k and 900 k bitrate profiles. Shortly after, manifest monitoring module 124 at computing devices 102 streaming the 2100 k bitrate profile of data stream 114 will cause a bitrate transition to the 900 k bitrate profile of the updated manifest. However, manifest monitoring module 124 at computing devices 102 that are streaming the 500 k or 900 k bitrate profiles will not perform a bitrate profile transition, and thus users at these devices will continue watching the program at 500 k and 900 k. Later, the 2100 k bitrate profile is fixed, and thus it is added back to the manifest. A while later, manifest monitoring module 124 may detect that the manifest has been updated with the 2100 k bitrate profile, and transition playback of the data stream using the 2100 k bitrate profile for those computing devices that have enough sufficient bandwidth.

In a second implementation example, consider that there are three bitrate profiles broadcasting live: 500 k, 900 k, and 2100 k, and that each of these bitrate profiles need to be restarted. In this case, manifest update module 122 can create two temporal bitrate profiles of 400 k and 1500 k. Manifest monitoring module 124 detects the updated manifest, and transitions each computing device to playing back the data stream using the 400 k bitrate profile, which is the lowest bitrate of the new configuration. A short time later, manifest monitoring module 124 switches playback of the data stream to the 1500 k bitrate profile if the bandwidth at the computing device is sufficient. Later, the three bitrate profiles may be added back to the manifest, and manifest monitoring module can automatically transition the computing devices to playing back the data stream using the highest bitrate profile based on the available bandwidth.

Example Procedures

The following discussion describes live manifest update techniques that may be implemented utilizing the previously described systems and devices. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks.

Figure 6:
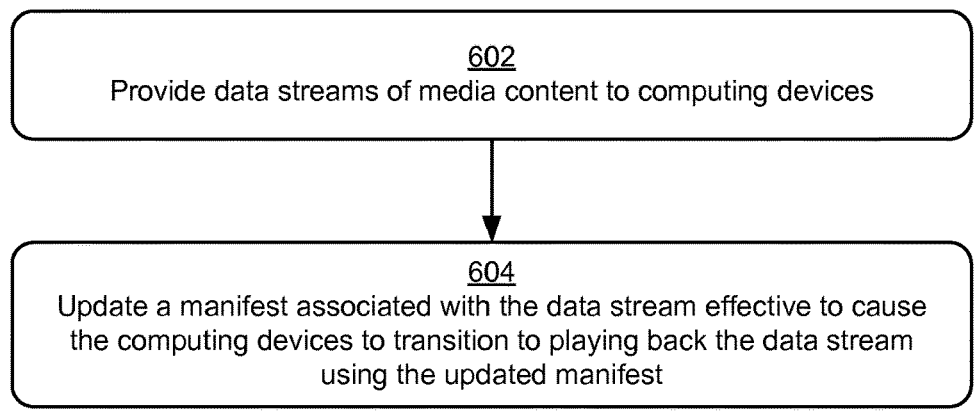
FIG. 6 illustrates a procedure in an example implementation of updating a manifest associated with a data stream.

FIG. 6 illustrates a procedure 600 in an example implementation of updating a manifest associated with a data stream.

At 602, data streams of media content are provided to computing devices. For example, service provider 104 provides data streams 114 of media content 110 to computing devices 102.

At 604, a manifest associated with the data stream is updated effective to cause the computing devices to transition to playing back the data stream using the updated manifest. For example, manifest update module 122 provides an update 408 to manifest 120 to generate an updated manifest 410. Updating the manifest causes computing devices 102 to transition to playing back the data stream using updated manifest 410 without restarting playback of the data stream.

Figure 7:
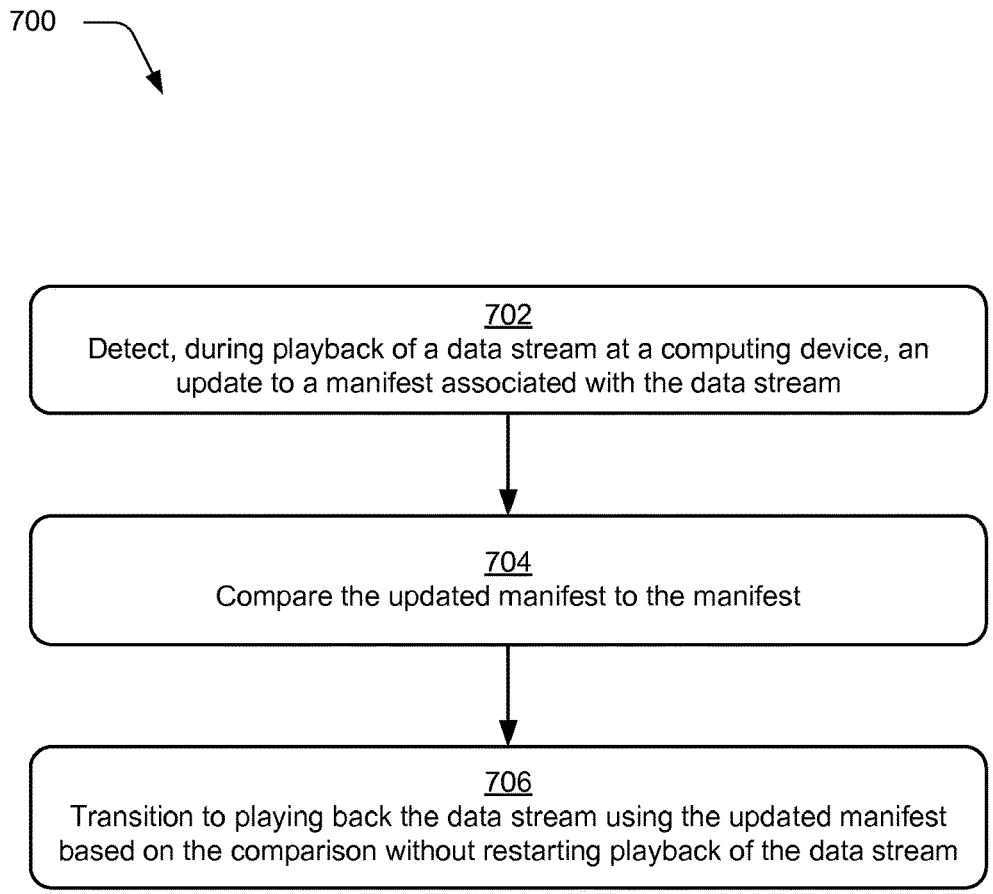
FIG. 7 illustrates a procedure in an example implementation of detecting an update to a manifest associated with a data stream during playback of the data stream, and transitioning to playing back the data stream using the updated manifest.

FIG. 7 illustrates a procedure 700 in an example implementation of detecting an update to a manifest associated with a data stream during playback of the data stream, and transitioning to playing back the data stream using the updated manifest.

At 702, an update to a manifest associated with a data stream is detected during playback of the data stream at a computing device. For example, manifest monitoring module 124 monitors for and detects an update to manifest 120 associated with data stream 114 during playback of data stream 114 at computing device 102.

At 704, the updated manifest is compared to the manifest. For example, manifest monitoring module 124 compares updated manifest 410 to the original manifest 120.

At 706, a transition to playing back the data stream using the updated manifest is caused based on the comparison. For example, manifest monitoring module 124 causes a transition to playing back data stream 114 using updated manifest 410 based on the comparison of updated manifest 410 to manifest 120 without restarting playback of the data stream.

Having described example procedures in accordance with one or more implementations, consider now an example system and device that can be utilized to implement the various techniques described herein.

Example System and Device

Figure 8:
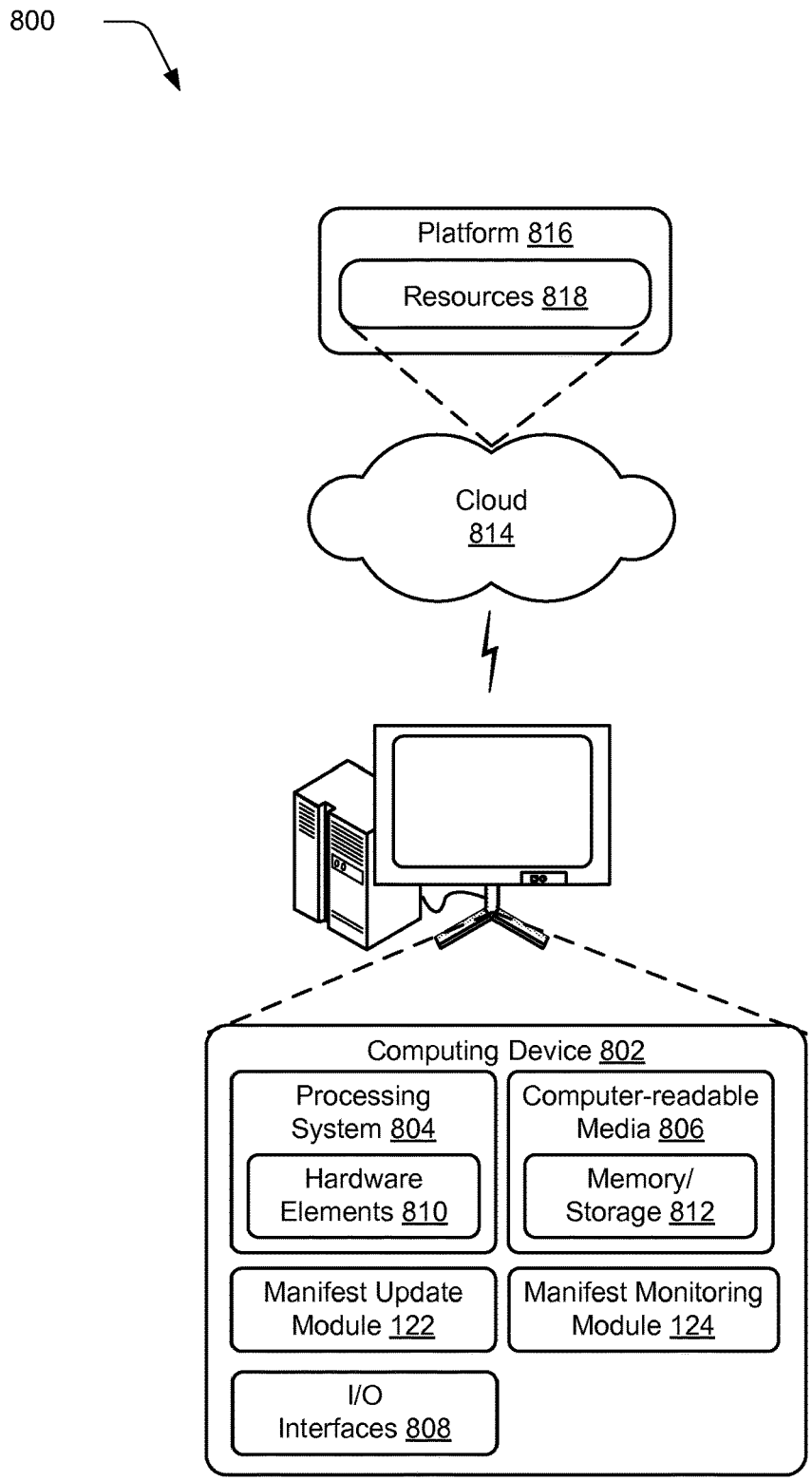
FIG. 8 illustrates an example system that includes an example computing device that is representative of one or more computing systems and/or devices that may implement the various techniques described herein.

FIG. 8 illustrates an example system generally at 800 that includes an example computing device 802 that is representative of one or more computing systems and/or devices that may implement the various techniques described herein. This is illustrated through inclusion of manifest update module 122 and a manifest monitoring module 124 which may be configured to implement the live manifest update techniques as previously described.

The computing device 802 may be, for example, a server of a service provider, a device associated with a client (e.g., a client device), an on-chip system, and/or any other suitable computing device or computing system. The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may comprise semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a client device, the method comprising:
    playing back a data stream at the client device using a bitrate profile of the data stream, the data stream associated with a manifest that specifies locations for multiple bitrate profiles of the data stream;
    during playback of the data stream, monitoring, by a manifest monitoring module implemented at the client device, for updates to the manifest by a service provider;
    detecting, by the manifest monitoring module at the client device and during playback of the data stream, an updated manifest associated with the data stream;

comparing, by the manifest monitoring module at the client device, one or more bitrate profiles specified in the updated manifest to the multiple bitrate profiles specified in the manifest;

selecting, by the manifest monitoring module at the client device, one of the multiple bitrate profiles specified in the updated manifest based on the comparison; and transitioning to playing back the data stream using the selected bitrate profile of the updated manifest without restarting playback of the data stream.

2. The method as recited in claim 1, wherein the transitioning further comprises:

determining that the updated manifest includes a same bitrate profile as the bitrate profile of the data stream currently being played back; and transitioning to playing back the data stream using the same bitrate profile of the updated manifest.

3. The method as recited in claim 1, wherein the transitioning further comprises:

determining that the updated manifest does not include a same bitrate profile as the bitrate profile of the data stream currently being played back;

determining a common bitrate profile that is included in both the manifest and the updated manifest;

switching to playing back the data stream using the common bitrate profile of the manifest; and transitioning to playing back the data stream using the common bitrate profile of the updated manifest.

4. The method as recited in claim 1, wherein the transitioning further comprises:

determining that the updated manifest does not include a same bitrate profile as the bitrate profile of the data stream currently being played back;

determining that the updated manifest and the current manifest do not include a common bitrate profile; and transitioning to playing back the data stream using a lowest bitrate profile of the updated manifest.

5. The method as recited in claim 4, further comprising switching from playing back the data stream using the lowest bitrate profile of the updated manifest to playing back the data stream using a higher bitrate profile of the updated manifest based on available bandwidth.

6. The method as recited in claim 1, wherein the monitoring comprises monitoring the date stream for updates to the manifest in a predetermined interval.

7. The method as recited in claim 1, wherein the monitoring comprises monitoring the data stream to detect a modified time and Etag from a hypertext transfer protocol (HTTP) request response.

8. The method as recited in claim 1, wherein the data stream is configured in accordance with a hypertext transfer protocol (HTTP).

9. The method as recited in claim 1, wherein the data stream comprises an HTTP Dynamic Streaming (HDS) data stream or an HTTP live streaming (HLS) data stream.

10. The method as recited in claim 1, wherein the manifest is configured in accordance with HTTP live streaming (HLS).

11. A system comprising:

one or more modules implemented at least partially in hardware and configured to perform operations comprising:

providing data streams of media content to client devices to enable playback of the data streams by the client devices; and updating a manifest associated with the data stream effective to cause a manifest monitoring module implemented at the client devices to detect the updated manifest during playback of the data stream, select a bitrate profile of the updated manifest based on a comparison of bitrate profiles of the manifest to bitrate profiles of the updated manifest, and transition to playing back the data stream using the selected bitrate profile of the updated manifest without restarting playback of the data stream.

12. The system as recited in claim 11, wherein updating the manifest comprises updating a server location of one or more bitrate profiles of the manifest.

13. The system as recited in claim 11, wherein updating the manifest comprises removing one or more bitrate profiles from the manifest.

14. The system as recited in claim 11, wherein updating the manifest comprises adding one or more bitrate profiles to the manifest.

15. The system as recited in claim 11, wherein the data stream comprises an HTTP Dynamic Streaming (HDS) data stream or an HTTP live streaming (HLS) data stream.

16. A client device comprising:

one or more processors;

one or more memories comprising instructions stored thereon that, responsive to execution by the one or more processors, implement a manifest monitoring module at the client device, the manifest monitoring module configured to perform operations comprising:

detecting, during playback of an HTTP live streaming (HLS) data stream at the client device, an update to a manifest associated with the HLS data stream by a service provider;

comparing one or more bitrate profiles specified in the updated manifest to one or more bitrate profiles specified in the manifest;

selecting one of multiple approaches to transition to playback of the HLS data stream using the updated manifest, the selecting based on a current bitrate profile of the HLS data stream being played back by the client device and the comparison of one or more bitrate profiles specified in the updated manifest to the one or more bitrate profiles specified in the manifest; and transitioning, using the selected approach, to playback of the HLS data stream using the updated manifest.

17. The client device as recited in claim 16, wherein the transitioning further comprises:

determining that the updated manifest includes a same bitrate profile as the current bitrate profile of the HLS data stream being played back; and transitioning to playing back the HLS data stream using the same bitrate profile of the updated manifest.

18. The client device as recited in claim 16, wherein the transitioning further comprises:

determining that the updated manifest does not include a same bitrate profile as the current bitrate profile of the HLS data stream being played back;

determining a common bitrate profile that is included in both the manifest and the updated manifest;

switching to playing back the HLS data stream using the common bitrate profile of the manifest; and transitioning to playing back the HLS data stream using the common bitrate profile of the updated manifest.

19. The client device as recited in claim 16, wherein the transitioning further comprises:

determining that the updated manifest does not include a same bitrate profile as the current bitrate profile of the HLS data stream being played back;

determining that the updated manifest and the current manifest do not include a common bitrate profile; and
transitioning to playing back the HLS data stream using a lowest bitrate profile of the updated manifest.

20. The client device as recited in claim 16, wherein the manifest uses an .m3u8 file extension.

\* \* \* \* \*